United States Patent [19]
Mayled

[11] Patent Number: 5,951,865
[45] Date of Patent: Sep. 14, 1999

[54] NESTABLE WATER FILTERING APPARATUS

[76] Inventor: Edward C. Mayled, 28 Groveland Crescent, Brampton, Ontario, Canada, L6S 1L2

[21] Appl. No.: 08/877,181

[22] Filed: Jun. 17, 1997

[51] Int. Cl.⁶ .......................... B01D 24/42; B65D 21/04
[52] U.S. Cl. .................... 210/474; 210/248; 222/189.06; 206/509
[58] Field of Search ..................................... 210/473, 474, 210/476, 477, 238, 239, 248; 222/143, 183, 189.06, 189.07; 206/507, 220, 206, 505, 501, 514; 220/501

[56] References Cited

U.S. PATENT DOCUMENTS

| | | | |
|---|---|---|---|
| 341,068 | 5/1886 | Smith | 210/476 |
| 1,187,364 | 6/1916 | Monnot | 206/210 |
| 4,716,824 | 1/1988 | Hand et al. | 99/516 |
| 4,969,996 | 11/1990 | Hankammer | 210/282 |
| 5,076,912 | 12/1991 | Belz et al. | 210/94 |

Primary Examiner—Matthew O. Savage
Assistant Examiner—Terry K. Cecil
Attorney, Agent, or Firm—Edward H Oldham

[57] ABSTRACT

This invention relates to a compact water filtering apparatus which is portable and convenient for personal use especially when travelling. The device in its simplest form comprises three interdependent members, two storage members which stack one upon the other in its working configuration, and a filtering member which is attached to the bottom of the upper storage member for filtering tap water contained in the top storage member. When desired, the top member may be inserted into the lower member in a nested configuration for convenience when travelling.

10 Claims, 2 Drawing Sheets

NESTABLE WATER FILTERING APPARATUS

BACKGROUND OF THE INVENTION

Because of the concerns of informed consumers for high quality drinking water, water filtering devices wherein a cartridge of activated charcoal is employed as an active filtering element, have found wide acceptance in domestic residences. Because of the convenience and efficiency of these filtering devices, the modern consumer has adapted the use of these devices, which while primarily intended for domestic use in a home, to be used for filtering drinking water in temporary lodging facilities such as hotel accommodations, etc. While such use is just as efficient as use in a domestic residence, the domestic filtering device is large and cumbersome using up valuable packing space in the traveller's luggage.

It is with a view to providing a compact, nestable filtering device that this invention is directed. This invention will provide an abundant quantity of filtered drinking water in its working configuration, but yet only requires slightly more than half the working volume for the complete unit when in its portable state. At the same time, the filtering capability and efficiency is equal to full size domestic filtering devices.

PRIOR ART

Canadian Patent 1,374,660—Dec. 14, 1982

This patent shows an early version of water purifying apparatus which essentially consists of a pair of interconnected vessels. In this instance, the vessels do not "nest" and because the upper and lower vessels are connected together in a sealed fashion, a vent pipe must be provided to prevent pressurization of the water in the lower vessel. Because of the peculiar shapes of the upper and lower vessels, it is almost impossible to pack this device in a compact manner suitable for travelling.

Canadian Patent 2,016,805—Dec. 7, 1990

This patent appears to describe a water filtering device wherein a funnel shaped reservoir is somehow supported in a conically shaped receptacle. There is no evidence of nesting but the reservoir and receptacle do not appear to "nest" for compactness. Both the receptacle and reservoir are conical sections which are not relevant to the invention of this application.

Canadian Patent 1,331,346—Aug. 9, 1994

This device shows a filtering device having a pair of interconnected vessels in which the top vessel is fitted with a filter element which is sealedly connected into the top vessel but projects into the lower vessel during use. The top vessel merely sits on top of the lower vessel but does not seal at this interface, thus, no vent is required as previously above.

Although the device is quite compact, there is no provision for inserting the top vessel into the interior of the lower vessel to form a compact unit convenient for travelling. It is to be noted that both upper and lower vessels present substantially cylindrical exterior surfaces.

SUMMARY OF THE INVENTION

This invention relates to a traveller's filtering device and is intended primarily for filtering drinking water while away from one's principal residence. The device comprises a pair of cube shaped vessels, each having an open top, the top vessel being slightly smaller than the bottom vessel so that the pair form a nestable combination when configured in a carrying mode for travelling.

When assembled to the operative filtering mode, the smaller top vessel is removed from the lower vessel and twisted through an angle of about 45° so that the bottom of the top vessel fits into the top vessel in a positive manner so as to prevent rotation of the top vessel with respect to the lower vessel and thus provide positive support for the top vessel while being located on the lower vessel. The top vessel may be supplied with a lid to prevent contamination caused by the presence of foreign airborne particles which may fail into the top vessel during use.

The advantages of this device over the prior art is the compactness of the device for ease of portability and the generous capacity for providing filtered water, generally not found in portable devices. A large filter element is utilized to provide a large filtering capacity for the provision of a generous supply of filtered water in a short span of time.

The device is transparent so as to allow the user to gauge the amount of water in each vessel during use. A nestable transparent lid is provided to close the top vessel during use if desired.

This device relates to a pair of cube shaped vessels which may be stacked one above the other in a staked relationship in the water filtering mode, or the two vessels may be nested one within the other for ease of transport. A filtering element is attached to the lower surface of the top vessel for filtering water passing therethrough. A lid may be used to close the top vessel during use.

The top vessel is slightly smaller than the lower vessel and has the lower most portions of the comers truncated so as to form four triangular ledges to rest on the top wall surfaces of the lower vessel.

DESCRIPTION OF THE PREFERRED EMBODIMENT

Figure 1:
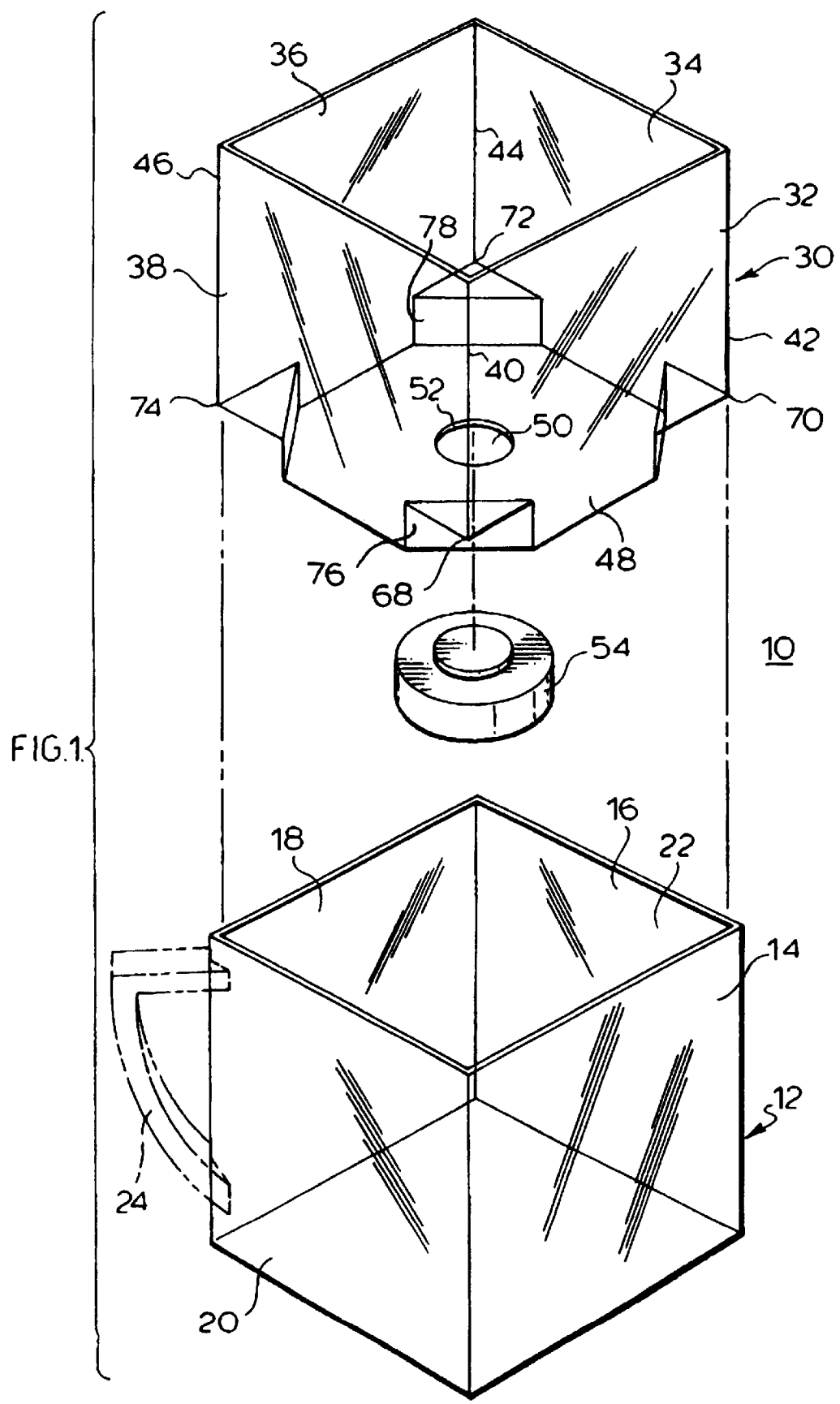
FIG. 1 is a perspective exploded view of the device.

Referring now to the figures and FIG. 1 in particular, wherein the parts of the device are shown in position one above the other. A water filtering device 10 is shown having a lower vessel 12 which is composed of transparent material such as high impact plastic and being in the form of a cube having sides 14, 16, 18 and 20 and having a top opening 22. A handle 24 (optional) may or may not be provided.

A top cubically shaped top vessel 30 is shown composed of the same or similar material to the lower vessel and of substantially the same shape. Vessel 30 has four sides 32, 34, 36 and 38 joined to each other at corners 40, 42, 44 and 46. A bottom wall 48 is sealedly joined to the sidewalls 32, 34, 36 and 38 to provide a water tight enclosure. In the center of the bottom wall 48 is an aperture 50 having a projection means 52 for locking the filter device 54 to the lower surface of the bottom wall 48. The filter 54 may be a "snap in" device or it may be sealingly attached to top vessel 30 by threads or a bayonet type fitting. There are many acceptable types of filters which will successfully function with applicant's device, however, the filter shown (hockey puck shape) is to be preferred.

The shape of the bottom of the top vessel 30 is most interesting in that four triangularly shaped portions are removed from corners 40, 42, 44 and 46. These corner portions have been removed to provide an octagonal shaped lower portion having four projecting corners 68, 70, 72 and 74. The flat portions such as 76 at corner 68 and its complimentary surface 78 at corner 72 are spaced apart as far as walls 34 and 38 are spaced. This dimension is quite important for the stacking operation of this device.

A lid may be provided for the apparatus will fit into the top opening of upper vessel 30 to prevent further contamination of the prefiltered water contained therein.

Figure 3:
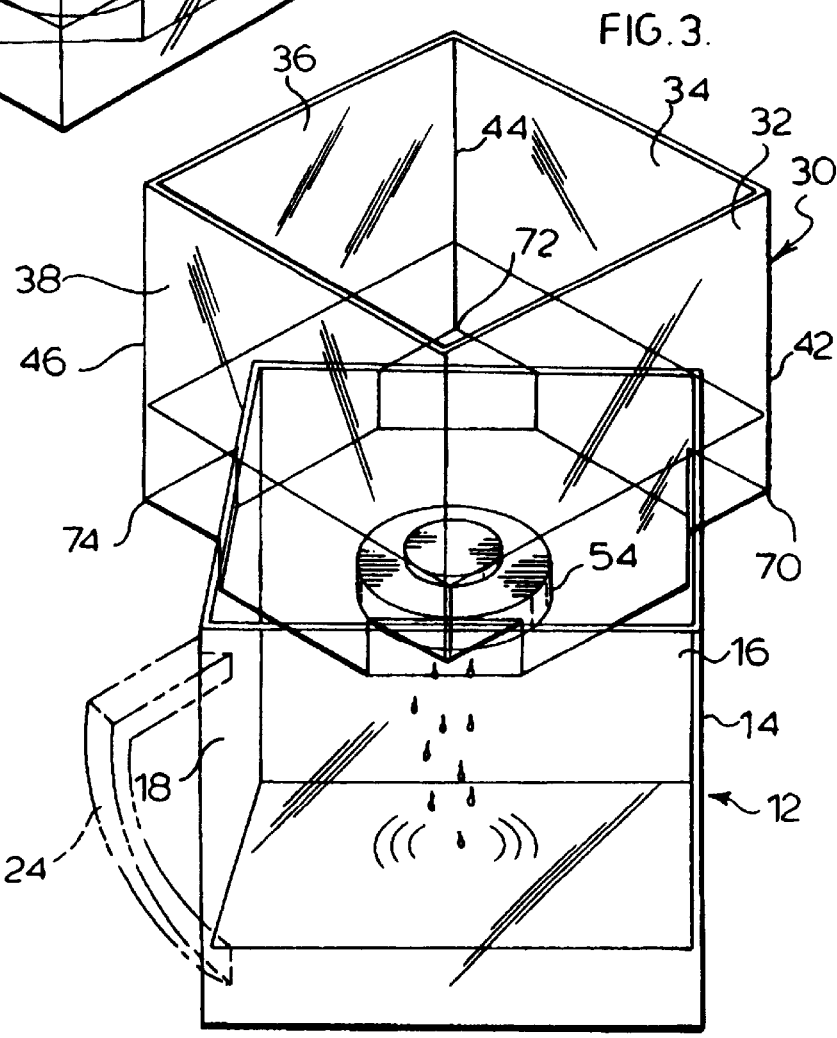
FIG. 3 is a perspective of the device in its transport mode.

In operation, the filter 54 is attached to the lower surface of vessel 30 and for travelling vessel 30 is placed inside vessel 10 as shown in FIG. 3. Because vessel 30 is slightly smaller than vessel 10, vessel 30 may be conveniently "nested" inside vessel 10. A lid 80 may be placed on the opening of the vessel 30 to prevent the ingress of foreign material whilst travelling.

Figure 2:
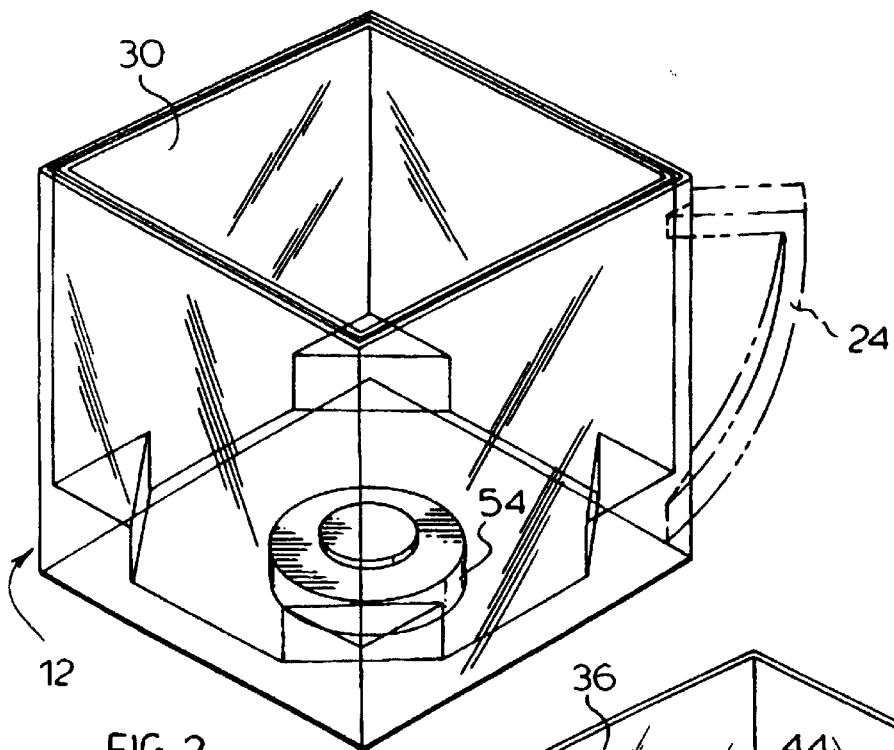
FIG. 2 is a perspective of the device in its operating mode.

When it is desired to utilize the device in its filtering mode, vessel 30 is removed from the inside of vessel 10 (see FIG. 2) and while vessel 10 is standing in its upright position, vessel 30 is placed on top of vessel 10 with its corners protruding over the walls 14, 16, 18 and 20 as shown in FIG. 3. Because the flats such as 76 and its counterpart 78 at corner 44 are spaced at the same distance as walls such as 32 and 36 are spaced, the top vessel 30 is securely held in place in the top of vessel 10. The lower octagonal shape of the vessel 30 projects slightly into the top of vessel 12 to firmly locate the vessel 30 positively above vessel 12. The corners 40, 42, 44 and 46 of vessel 30 project over the walls of vessel 10 to prevent the top vessel 30 from collapsing into the vessel 10 as in the travelling mode. A lid 80 may be placed over the top opening of vessel 30.

This device is shaped to hold a sizeable quantity of water and yet be convertible into a small package for compactness for travelling. The size of filter provides abundant filtered water quickly upon short demand time.

While other shapes may come to mind, the cubic shape lends itself to compact storage and ready and easy assemblage into an efficient filtering device of reasonable capacity.

I claim:

1. A device for filtering a predetermined quantity of water comprising a pair of complimentary nestable vessels which may be assembled so that an inner vessel may be stored within an outer complimentary vessel, or constructed to form a stacked pair in a stacked orientation, said vessels having substantially the same cubic shape having four sides joined at four corners, and an interconnecting bottom surface, each vessel having an opening at the top thereof, a top vessel of said pair having filter means attached to the bottom surface thereof, said top vessel having the corners truncated at said bottom surface by having similarly shaped, triangular portions removed from each corner so that the bottom surface of said top vessel presents an octagonal shape which may be projected into the top of said outer vessel a short distance in the stacked mode, such that each corner of the top vessel overhangs the side of the lower vessel of said pair in the stacked orientation.

2. A device as claimed in claim 1 wherein said top vessel may be rotated through 45° from said stacked mode for insertion into the lower vessel of said pair in the nested mode.

3. A device as claimed in claim 2 wherein said top vessel has a central aperture in the bottom surface thereof, wherein said aperture is in communication with said filter means.

4. A double vessel stacking water filtering apparatus comprising a reservoir for unfiltered water and a receptacle for receiving and storing filtered water received from said reservoir, said reservoir and receptacle each having general cubic shape, each vessel having an open top, said reservoir being slightly smaller than said receptacle so that said reservoir may fit inside said receptacle for compact storage, said reservoir having four sides integrally joined together at the corners thereof and with a bottom to form said reservoir, a truncation formed at the lower portion of each corner to form a ledge in each corner to permit said ledge to engage the top surface of said receptacle when said reservoir is stacked on top of said receptacle.

5. An apparatus as claimed in claim 4 wherein said truncation formed in each corner of said reservoir permits the insertion of said reservoir into the receptacle a predetermined distance when the reservoir is stacked on said receptacle for a filtering mode.

6. An apparatus as claimed in claim 5 wherein filter means is attached to said reservoir at the bottom thereof.

7. An apparatus as claimed in claim 6 wherein the reservoir has a central aperture formed in the lower surface thereof, said aperture being in communication with said filter means.

8. A dual vessel water filtering apparatus comprising a pair of nestable open topped vessels each having the general shape of a cube, a first vessel of said pair being of a size to be insertable inside a second vessel, each corner of the first vessel being truncated at its lower end in such a manner as to produce a ledge at the lower end of each corner and to form an octagonal shape in the bottom of said first vessel, said octagonal shape being of such shape that the distance between any opposing pair of sides of said octagonal shape equals the distance between the opposing sides of the reservoir.

9. Apparatus as claimed in claim 8 where said first vessel is provided with a central aperture in the octagonal shaped lower surface.

10. Apparatus as claimed in claim 9 wherein filtering means is sealing attached to said lower surface of said first vessel and is in communication with said aperture.

* * * * *